United States Patent Office 3,533,236
Patented Oct. 13, 1970

3,533,236
ENGINE FUEL SUPPLY SERVO SYSTEMS
Roger Victor Cottington, Aldershot, England, assignor to Minister of Technology in Her Britannic Majesty's Government of the United Kingdom of Great Britain and Northern Ireland, London, England
Filed Jan. 15, 1969, Ser. No. 791,342
Claims priority, application Great Britain, Jan. 22, 1968, 3,179/68
Int. Cl. F02c 9/04; F02d 31/00; F01b 25/06
U.S. Cl. 60—39.28
4 Claims

ABSTRACT OF THE DISCLOSURE

A gas turbine engine fuel control system comprises means for deriving an error signal representing the difference between the actual speed and a desired speed of a rotor in the engine, means for deriving three signals respectively proportional to the error signal, an integral function of the error signal, and a derivative function of the error signal, fuel control means for controlling the fuel supply to the engine in response to a combination of the said three signals, and means for controlling the relative weightings of the three signals in the said combination according to predetermined functions of the rotor speed. The derivative function signal may be made ineffective when the error signal is small.

---

Figure 1:
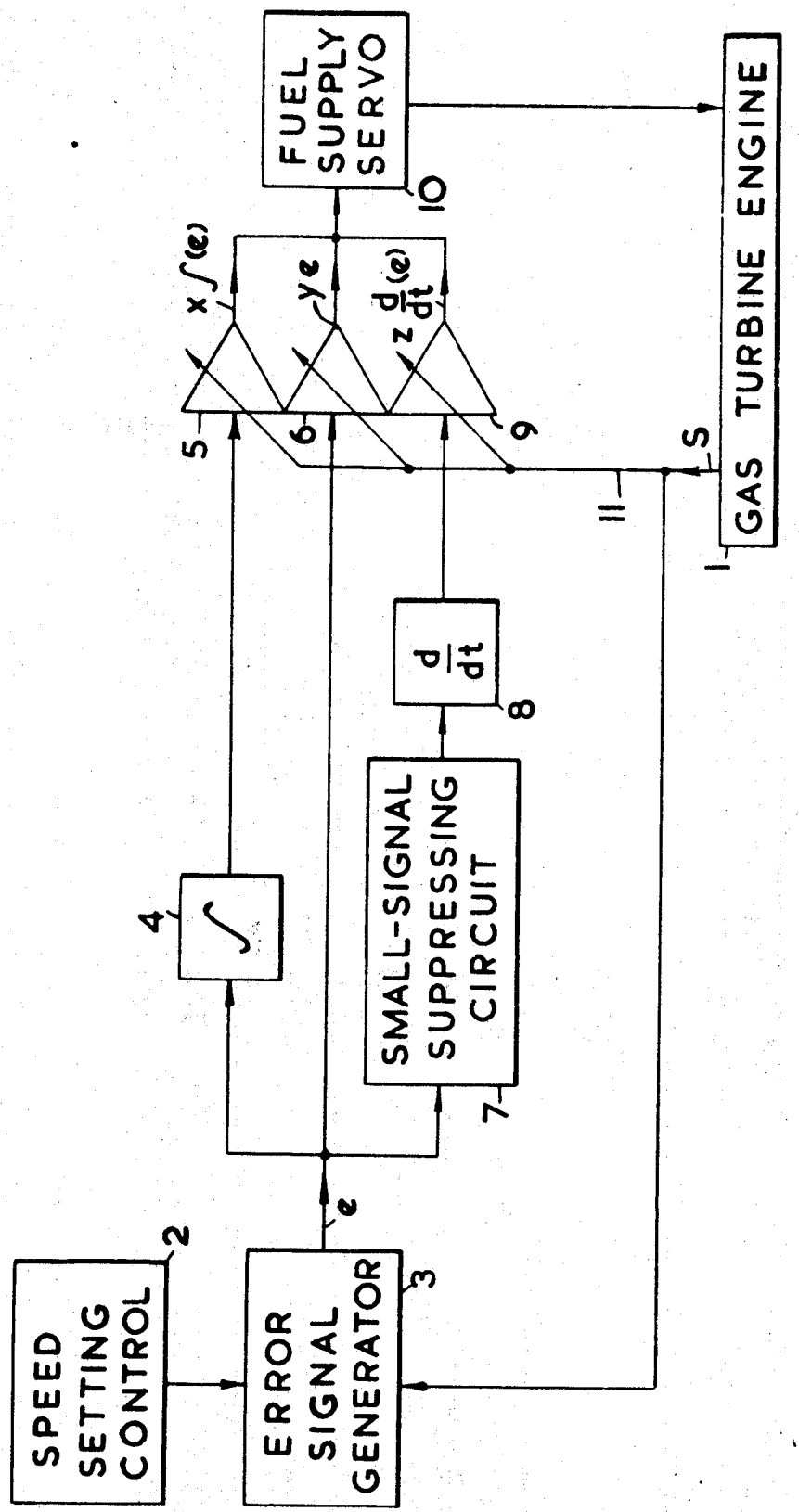

The present invention relates to closed loop servo systems for controlling the supply of fuel to gas turbine engines. Such systems are required to allow a pilot or engine controller to set a desired engine speed and to maintain the desired speed in accordance with a speed control lever setting.

According to the prevent invention, there is provided a system for controlling the supply of fuel to a gas turbine engine, including means for deriving an error signal representing the difference between the actual speed and a desired speed of a rotor in the gas turbine engine; means for deriving a control signal representing a summation of a first term, a second term and a third term, of which the first term comprises an integral function of the error signal and at least one multiplier the second term comprises a simple function of the error signal and at least one further multiplier, and the third term comprises a derivative function of the error signal and at least one still further multiplier; means for supplying fuel to the engine at a rate dependent on the control signal; and means responsive to the actual speed of the rotor for causing the multipliers to be varied as predetermined functions of the rotor speed.

Means may also be provided for suppressing the third term in the summation whenever the error signal is smaller than a predetermined magnitude.

In servo systems of various kinds, it is of course known to derive an error signal representing the difference between the actual value and a desired value of some variable. It is also known to generate signals proportional to the error signal, signals proportional to an integral function of the error signal, and signals proportioned to a derivative function of the error signal. For the purposes of this specification "an integral function of the error signal" may be taken to mean any signal derived from the error signal by a process involving or substantially equivalent to integration with respect to a time variable, "a derivative function of the error signal" may be taken to mean any signal derived from the error signal by a process involving or substantially equivalent to differentiation with respect to a time variable, and "a simple function of the error signal" may be taken to mean any signal derived from the error signal by process not involving any differentiation or integration with respect to time or any processes equivalent thereto.

The second term (proportional to the error signal) is arranged to predominate when a change of speed is required. Increasing the multiplier of this term tends to increase the speed of response of the system, but tends to reduce the stability and accuracy of the speed achieved. The first term (the integral function term) tends to compensate for these effects, thereby improving the stability and accuracy of the speed control. The third term (the derivative function term) provides an anticipatory action and can be arranged to help achieve a faster response without overshoot, or with an acceptable degree of overshoot. It does, however, tend to make the system undesirably sensitive to noise signals.

It has been found that when a gas turbine engine is to be controlled by a control signal formed by the summation of first, second and third terms as aforesaid, it is desirable to select optimum values for the multipliers of the three terms. Different values of the multipliers are desirable at different engine speeds, and the characteristics of the control system are considerably improved by making the three multipliers vary as predetermined functions of engine speed; appropriate functions may be deduced for a given engine from calculations and empirical results.

The effects of noise signals on the third term can be alleviated by arranging that the third term will be suppressed whenever the error signal is smaller than a predetermined magnitude. This avoids some speed fluctuations which would otherwise be caused by the noise signals.

Figure 2:
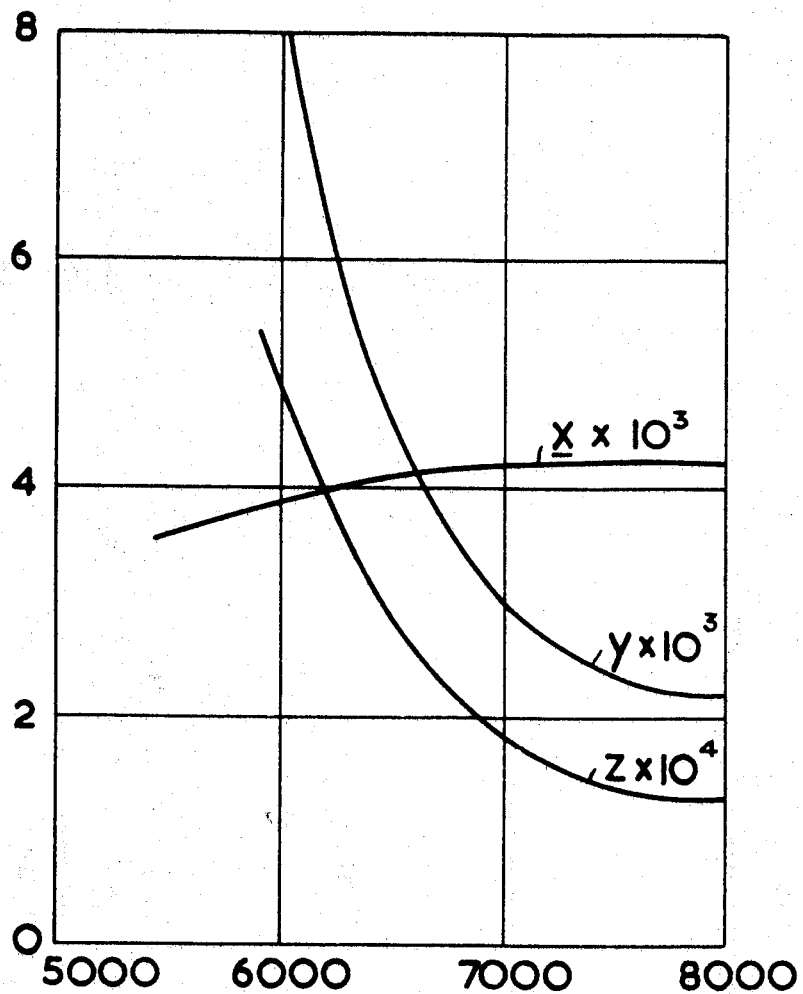

An embodiment of the invention will now be described, by way of example only, with reference to the accompany drawings, of which FIG. 1 is a schematic diagram of an engine fuel supply control system, and FIG. 2 is a graphical representation of some variables in the system of FIG. 1, plotted as functions of engine speed.

FIG. 1 shows a gas turbine engine 1 provided with a tachometer output for supplying a signal S which is proportional to the actual speed of a rotor within the engine. A speed setting control 2 is provided; it may be in the form of a throttle control lever fitted to a suitable transducer to provide an electrical output signal representing a desired engine speed. The desired speed signal from the speed setting control 2 and the actual speed signal S are applied to an error signal generator 3 which produced an error signal $e$ dependent on the difference between the desired speed signal and the actual speed signal.

The error signal $e$ is applied to three channels. The first channel includes an integrating circuit 4 and an amplifier circuit 5. The second channel provides a passive connection to an amplifier circuit 6. The third channel includes a small-signal suppressing circuit 7, a differentiating circuit 8 and an amplifier circuit 9, connected in series. The outputs of the amplifier circuits 5, 6 and 9 are combined and applied to the control signal input of a fuel supply servomechanism 10. The servomechanism 10 is arranged to control the supply of fuel to the engine 1. The amplifier circuits 5, 6 and 9 are separately-controllable variable-gain amplifiers and their gain control circuits are connected by a line 11 to the tachometer output S of the engine 1.

Though the action of the integrating circuit 4, the amplifier 5 receives a signal which is an integral function of the error signal $e$ and may be conveniently represented as $\int (e)$. The gain of the amplifier 5 will be represented as a first multiplier $x$, making its output equal to $x \int (e)$. The gain of the amplifier 6 will be represented as a second multiplier $y$, making its output equal to $ye$. The action of the differentiating circuit 8 provides the amplifier 9 with an input signal (except when the circuit 7 suppresses it) which is a derivative function of the error signal $e$ and may be conveniently represented as $$\frac{d}{dt}(e)$$

The gain of the amplifier 9 will be represented as a third multiplier $z$, making its output equal to $$z\frac{d}{dt}(e)$$

The multipliers $x$, $y$ and $z$ are arranged to depend on the signal S, according to three different non-linear functions. For one particular type of engine, suitable non-linear functions for $x$, $y$ and $z$ are shown in FIG. 2; it may be expected that suitable functions for other engines may have similar forms.

Clearly, the circuits 3 to 9 inclusive may be analogue computer circuits. The circuit 7 may then be a simple diode clamping or biassing arrangement. The circuits 4 and 8 need not necessarily have mathematically perfect integrating and differentiating effects. The circuits 5, 6 and 9 may be amplifier circuits with electronically-variable gain characteristics, the functions $x$, $y$ and $z$ being realised by the inclusion of appropriate non-linear networks (not shown) in their gain control connections. Alternatively, the amplifier circuits 5, 6 and 9 may be analogue-signal multiplying circuits.

Another alternative, would be to make the signals digital, in a part or the whole of the system, and use digital computing circuits for some or all of the circuits 3 to 9 inclusive. Yet another alternaitve possibly is to arrange a digital computer with a suitable programme to perform the functions of the circuits 3 to 9 inclusive. It should be clearly understood that such alternatives will come within the scope of the invention.

I claim:

1. A fuel control system for governing the supply of fuel to a gas turbine engine, comprising:
    means for deriving an error signal representative of any difference between a desired speed and an actual speed of a rotor in an engine controlled by the system,
    computer means connected to the comparison means and responsive to the error signal for deriving a control signal representing a summation of a first term plus a second term plus a third term, of which the first term comprises an integral function of the error signal and at least one multiplier, the second term comprises a simple function of the error signal and at least one further multiplier, and the third term comprises a derivative function of the error signal and at least one still further multiplier,
    fuel supply means, connected to the computer means and responsive to the control signal, for supplying fuel to the engine at a rate dependent on the value of the said control signal, and
    term control means connected to the computer means and responsive to a signal representative of the said actual speed, for causing the said multipliers to be varied according to predetermined functions of the said actual speed.

2. A fuel control system as claimed in claim 1 and wherein the said computer means includes means responsive to the error signal for suppressing the said third term of the said summation whenever the error signal is less than a predetermined magnitude.

3. A gas turbine engine having at least one rotor provided with tachometer means for measuring the actual speed of rotation of the said rotor, and provided with a fuel control system for governing the supply of fuel to the engine, comprising:
    control input means for setting up a signal representative of a desired speed of rotation of the said rotor,
    comparison means connected to the tachometer means and the said control input means, for deriving an error signal representative of any difference between the said actual speed and the said desired speed of the said rotor,
    computer means, connected to the comparison means and responsive to the error signal, for deriving a control signal representing a summation of a first term substantially equal to a first multiplier times an integral function of the error signal plus a second term substantially equal to a second multiplier times the error signal plus a third term substantially equal to a third multiplier times a derivative function of the error signal,
    fuel supply means, connected to the engine and to the computer means and responsive to the control signal, for supplying fuel to the engine at a rate dependent on the value of the said control signal, and
    term control means connected to the tachometer means and to the computer means, for causing the said first, second and third multipliers to be varied according to predetermined functions of the actual speed of rotation of the said rotor.

4. A gas turbine engine and fuel control system as claimed in claim 3 and wherein the said computer means includes means responsive to the error signal for suppressing the said third term of the said summation whenever the error signal is less than a predetermined magnitude.

References Cited

UNITED STATES PATENTS

| | | | |
|---|---|---|---|
| 2,628,606 | 2/1953 | Draper et al. | 123—102 |
| 2,666,171 | 1/1954 | Williams et al. | |
| 2,760,131 | 8/1956 | Braunagel. | |
| 2,827,910 | 3/1958 | Wells et al. | |
| 2,842,108 | 7/1958 | Sanders | 123—102 |
| 2,919,384 | 12/1959 | Guarino et al. | 317—5 |
| 3,030,053 | 4/1962 | Smith et al. | 60—39.28 X |
| 3,070,735 | 12/1962 | Kaiser et al. | 60—39.28 X |
| 3,139,922 | 7/1964 | Peczkowski | 60—39.25 X |
| 3,393,691 | 7/1968 | Longstreet et al. | 60—39.25 X |
| 3,469,395 | 9/1969 | Spitsbergen et al. | 60—39.28 |

OTHER REFERENCES

Sobey, A. J. & Suggs, A. M., Control of Aircraft and Missile Powerplants, New York and London, John Wiley & Sons, Inc., 1963, pp. 377–384.

AL LAWRENCE SMITH, Primary Examiner

U.S. Cl. X.R.

123—102; 290—40; 317—5; 318—18